UNITED STATES PATENT OFFICE.

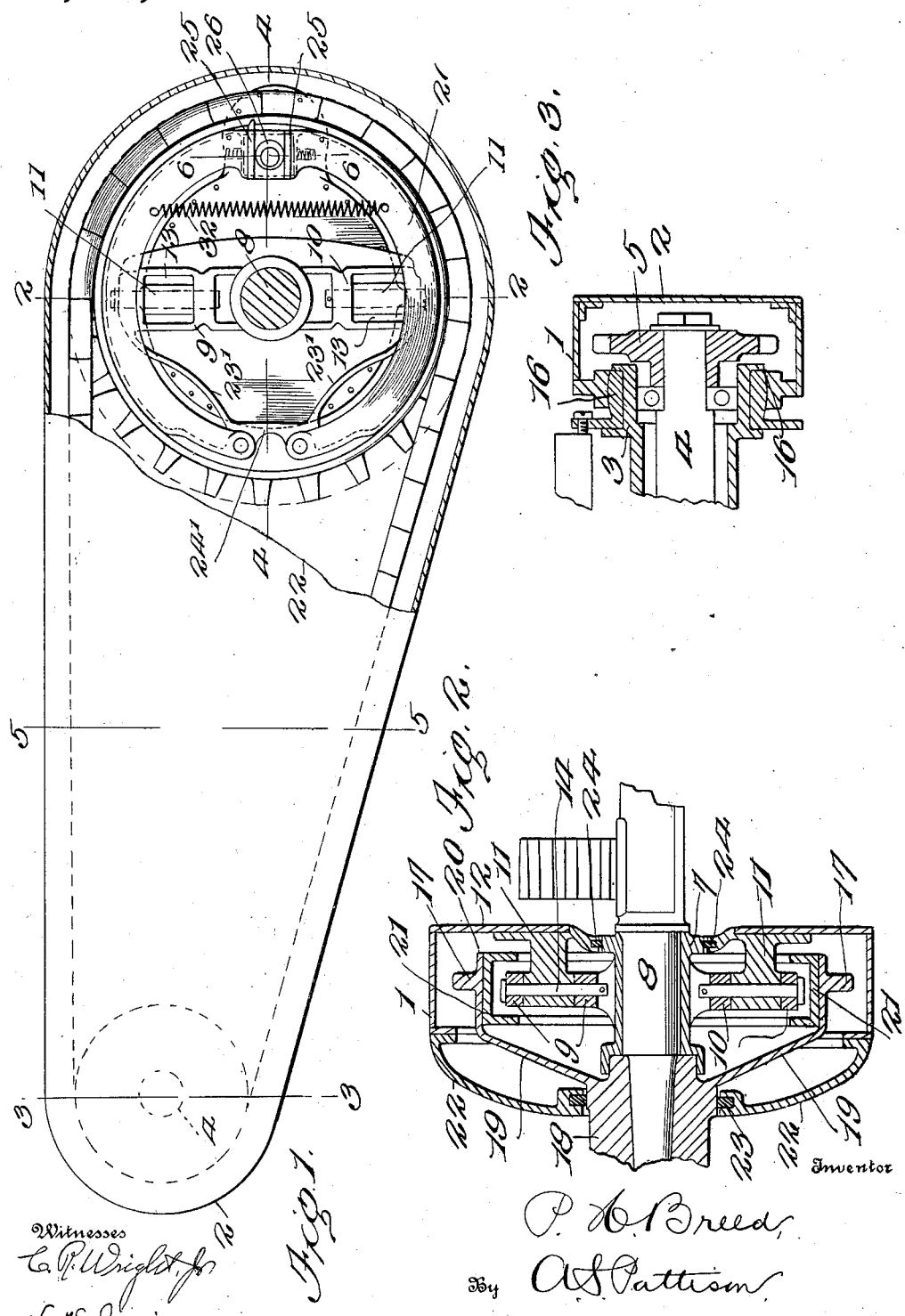

PRESTON H. BREED, OF PITTSFIELD, MASSACHUSETTS, ASSIGNOR, BY MESNE ASSIGNMENTS, TO ALDEN SAMPSON MANUFACTURING COMPANY, A CORPORATION OF NEW JERSEY.

CHAIN-CASE AND COÖPERATING PARTS FOR MOTOR-VEHICLES.

1,049,660. Specification of Letters Patent. Patented Jan. 7, 1913.

Application filed September 1, 1909, Serial No. 515,650. Renewed July 13, 1911. Serial No. 638,396.

*To all whom it may concern:*

Be it known that I, PRESTON H. BREED, a citizen of the United States, residing at Pittsfield, in the county of Berkshire and State of Massachusetts, have invented certain new and useful Improvements in Chain-Cases and Coöperating Parts for Motor-Vehicles, of which the following is a specification, reference being had therein to the accompanying drawing.

This invention relates to improvements in chain cases and coöperating parts for use on vehicles.

The invention is of special utility in motor trucks driven by gas engines.

The invention is directed primarily to the provision of an improved construction for the chain cases of self-propelled vehicles which permits the chain case to move freely in a direction transverse to the plane in which it lies. In this way the chain case is relieved of strains which would otherwise be imposed upon it by the side-sway of the body of the vehicle relatively to the rear axle. In practising the invention, the chain case is preferably mounted at its rear end upon a pivot so that it is free to move about a vertical axis, the pivotal mounting of the rear end of the case being preferably inside the case. The other end of the case is mounted in such a manner as to permit of the movement of the chain case about the pivotal axis above referred to; this may be done by providing a curved surface at the forward end of the chain case which bears upon and may move over a similarly curved surface upon a suitable supporting member. Furthermore, a chain case constructed in accordance with the invention may be readily made of material of such strength and rigidity that the case will serve as a distance member and the construction of the vehicle is therefore materially simplified. Also braking devices may be advantageously combined with the chain case and when this is done the case may serve as a torque member for the braking devices.

In the accompanying drawing—Figure 1 is a side elevation of a chain case embodying the present improvements. Fig. 2 is a vertical sectional view on the line 2—2 of Fig. 1. Fig. 3 is a vertical sectional view on the line 3—3 of Fig. 1.

The present improvement is more particularly designed for use in connection with that class of motor vehicles which have stationary axles upon which the driving and supporting wheels revolve, to which wheels are attached sprocket wheels around which the driving chains pass.

Referring now to the drawings, 1 is a chain case, which has its front end 2 swiveled in any suitable manner to a vehicle body (not shown) preferably by means of a bracket or shaft housing 3. As here shown the end of the jack shaft 4 projects into the front end of the chain case and carry sprocket wheels 5.

A sleeve 7 is placed on the stationary axle 8, and this sleeve is provided with an upwardly extending portion or member 9 and a downwardly extending portion or member 10. A suitable supporting and hinging member, or members 11, are secured to the inner side of the inner wall 12, of the rear end of the chain case 1. These members 11 pass into openings 13, formed in the members 9 and 10, and these parts are hinged together by means of suitable pins 14. In this way the rear end of the chain case has a vertically arranged supporting hinge which permits the rear end of the chain case to swing laterally or have a horizontal movement to prevent side strains upon the chain case by reason of the side sway of the vehicle body, the front end of the chain case being supported upon spherical bearing 16, which permits this swinging or hinged movement of the rear end of the chain case. By this arrangement of the chain case it acts as a distance member between the end of the jack shaft 4 and the end of the axle 8.

A sprocket 17 is secured in any manner to the wheel hub 18. As here shown a flange 19 serves for this connection, but the manner of connecting the sprocket 17 to the wheel may be varied without departing from the present invention. The inner face 20 of the sprocket 17, acts as a braking surface and located to co-act with this braking surface are the brake shoes 21. A protection or covering for the sprocket connecting member 19 is formed by the outer wall 22 of the chain case and suitable packings 23 and 24 are arranged between the inner and outer walls of the chain case, and the hub 18 and sleeve 7 to exclude dust and dirt and to make the chain case oil tight.

The anchored ends of the brake shoes 21 are hinged to members 23', which project forwardly and inwardly from the outer ends of the parts 9 and 10, and these members are connected as at 24' so that they constitute a single forwardly projecting member. The free ends of the brake shoes 21, are provided with cam surfaces 25, between which a cam 26 is located. The cam 26 is mounted upon a suitable shaft which projects through the wall of the casing and at its outer end is provided with means whereby the cam may be rocked back and forth through a short range, so as to operate the brake-shoes 21. By this construction it will be seen that the brake-shoes are inclosed within the casing, so that they are protected from injury and the accumulation of dirt, and yet they may be readily operated from any convenient point as may be necessary.

It will be seen that the brake-shoes are held against rotation about the axle 8 because of the fact that they are supported upon the chain case by the members 23' and the arms 11 on which those members are pivotally mounted and which are secured to the wall of the chain case. Thus, the chain case forms a torque member for the brake-shoes 21. Also, the case or a part thereof may be made of material of sufficient strength and rigidity to permit of the use of the chain case as a distance member between the rear axle and the jack shaft. The manner in which the chain case is supported permits it to move freely in a direction transverse to the plane in which it lies so as to avoid strains on the case, due to the side-sway of the body of the vehicle. This movement of the chain case takes place about the pins 11 as a pivotal axis and the forward end of the case slides on the member 16 so as to permit such movement.

For convenience in setting forth the invention in the appended claims, the front sprocket 5 will be termed the driving sprocket, its shaft 4 the driving shaft, the rear sprocket 17 the driven sprocket and the wheel or hub which carries the sprocket 17 the driven hub.

Having thus described my invention, what I claim and desire to secure by Letters Patent is:

1. In a vehicle, the combination of a vertically disposed driving and driven sprockets, a chain running thereon, a vertically disposed case inclosing the sprockets and chain, a hinged support for one end of the case including vertically disposed pivots about which the case may turn in a direction transverse to the plane of the case, and means for supporting the other end of the case, substantially as set forth.

2. In a vehicle, the combination of a driving sprocket, a driven sprocket, the sprockets adapted to receive a driving chain, a chain case having its front end swiveled in relation to the driving sprocket, the rear end of the chain case having a vertically arranged supporting hinge adapted to permit the ends of the case to swing horizontally for the purpose described.

3. In a vehicle, the combination of a driving sprocket, a driven sprocket apart therefrom, the sprockets adapted to receive a driving chain, a chain case extending between and embracing the said sprockets and chain, a rear axle, a wheel hub rotatable thereon and to which the said driven sprocket is attached, the rear end of the chain case carrying inwardly extending hinge members and co-acting hinge members carried by the said axle.

4. In a vehicle, the combination of a driving sprocket, a driven sprocket, the sprockets adapted to receive a driving chain, a supporting axle for the driven sprocket, a member or sleeve supported by the axle independent of the sprocket, a chain case extending between and embracing the said sprockets and chain, the rear end of the chain case and the said sleeve having a vertical hinge connection to permit the ends of the case to swing horizontally for the purpose described.

5. In a vehicle, the combination of two sprockets mounted for rotation in substantially the same plane, a chain running on said sprockets, a case inclosing the sprockets and chain, a support for one end of said case, a member on said support within the case, a member mounted on and lying within the case, a pivotal connection between said members whereby the case may turn in a direction transverse to the plane in which it lies and means for supporting the other end of the case, substantially as set forth.

6. In a vehicle, the combination of two sprockets mounted for rotation in substantially the same plane, a chain running on said sprockets, a case inclosing the sprockets and chain, a support extending within one end of the case, means for pivotally mounting said end of the case upon the support so that the case may turn about the pivot in a direction transverse to the plane in which it lies and a member supporting the other end of the case, said member and case having coacting curved surfaces permitting movement of the case in a direction transverse to the plane in which it lies, substantially as set forth.

7. In a vehicle, the combination of two sprockets mounted for rotation in substantially the same plane, a chain running on said sprockets, a case inclosing the sprockets and chain, a support extending within one end of the case, means for pivotally mounting said end of the case upon the support so that the case may swing about the pivot in a direction transverse to the plane in which it lies, a brake-member mounted on said support, means for operating the same, a brake member with which said members coöperate, and means for supporting the other end of the case, substantially as set forth.

8. In a vehicle, the combination of vertically disposed driving and driven sprockets, a chain running thereon, a vertically disposed case inclosing the sprockets and chain, a support for one end of the case including pivots located within the case and about which the case may turn in a direction transverse to the plane of the case, and means for supporting the other end of the case, substantially as set forth.

In testimony whereof I hereunto affix my signature in the presence of two witnesses.

PRESTON H. BREED.

Witnesses:
HELEN A. PARKER,
G. H. BUCKINGHAM.

Copies of this patent may be obtained for five cents each, by addressing the "Commissioner of Patents, Washington, D. C."

It is hereby certified that in Letters Patent No. 1,049,660, granted January 7, 1913, upon the application of Preston H. Breed, of Pittsfield, Massachusetts, for an improvement in "Chain-Cases and Coöperating Parts for Motor-Vehicles," an error appears in the printed specification requiring correction as follows: Page 2, line 61, strike out the article "a" second occurrence; and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.*